United States Patent
Furukawa et al.

(10) Patent No.: US 9,692,270 B2
(45) Date of Patent: Jun. 27, 2017

(54) MOTOR INCLUDING BRACKETS AND FIXING MEMBERS

(71) Applicant: Nidec Corporation, Kyoto (JP)

(72) Inventors: Keizo Furukawa, Kyoto (JP); Nobuyuki Iwashita, Kyoto (JP); Jun Nagasawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 828 days.

(21) Appl. No.: 14/065,549

(22) Filed: Oct. 29, 2013

(65) Prior Publication Data

US 2014/0132122 A1    May 15, 2014

(30) Foreign Application Priority Data

Nov. 13, 2012  (JP) ................. 2012-249736

(51) Int. Cl.
*H02K 5/15* (2006.01)
*H02K 11/00* (2016.01)
*H02K 3/34* (2006.01)
*H02K 5/08* (2006.01)
*H02K 5/173* (2006.01)
*H02K 11/215* (2016.01)
(Continued)

(52) U.S. Cl.
CPC .............. *H02K 3/345* (2013.01); *H02K 5/08* (2013.01); *H02K 5/15* (2013.01); *H02K 5/1732* (2013.01); *H02K 11/215* (2016.01); *H02K 11/33* (2016.01); *H02K 5/225* (2013.01)

(58) Field of Classification Search
CPC .................. H02K 3/34; H02K 3/345
USPC ......................... 310/89, 214, 215
See application file for complete search history.

(56) References Cited

U.S. PATENT DOCUMENTS

| 4,384,226 A * | 5/1983 | Sato .............. H02K 5/15 |
| | | 310/216.115 |
| 4,765,054 A * | 8/1988 | Sauerwein ........ H02K 1/185 |
| | | 29/596 |
| 7,064,462 B2 | 6/2006 | Hempe et al. |

(Continued)

FOREIGN PATENT DOCUMENTS

| JP | 07-059280 A | 3/1995 |
| JP | 09-154250 A | 6/1997 |

(Continued)

OTHER PUBLICATIONS

Machine Translation, Honda et al., JP 201 21 91 688 A, Oct. 4, 2012.*

*Primary Examiner* — Thomas Truong
(74) *Attorney, Agent, or Firm* — Keating & Bennett, LLP (57) ABSTRACT

A motor includes a shaft, an annular rotor magnet, an armature arranged to cover the rotor magnet, an upper bracket fixed to an axial upper portion of the armature, and a lower bracket fixed to an axial lower portion of the armature. The armature includes an annular core-back, a plurality of magnetic pole teeth protruding radially inward from the core-back, an insulator arranged to cover the magnetic pole teeth, and a coil wound around the magnetic pole teeth through the insulator. The insulator includes an annular core-back insulating portion arranged radially outward of the coil and extended axially upward. The upper bracket is fixed by a plurality of fixing members positioned radially inward of an outer circumferential surface of the core-back.

16 Claims, 9 Drawing Sheets

(51) Int. Cl.
*H02K 11/33* (2016.01)
*H02K 5/22* (2006.01)

(56) References Cited

U.S. PATENT DOCUMENTS

| | | | |
|---|---|---|---|
| 7,521,826 B2 | 4/2009 | Hempe et al. | |
| 2004/0217669 A1* | 11/2004 | Fujii | H02K 1/148 |
| | | | 310/216.045 |
| 2006/0071563 A1 | 4/2006 | Fujii | |
| 2006/0082242 A1* | 4/2006 | Schill | H02K 1/146 |
| | | | 310/216.004 |
| 2009/0224617 A1* | 9/2009 | Bottger | H02K 1/146 |
| | | | 310/89 |
| 2011/0169358 A1 | 7/2011 | Furukawa et al. | |

FOREIGN PATENT DOCUMENTS

| | | |
|---|---|---|
| JP | 11-220860 A | 8/1999 |
| JP | 2003-088081 A | 3/2003 |
| JP | 2004-229429 A | 8/2004 |
| JP | 2012-191688 A | 10/2012 |
| JP | 2012-222867 A | 11/2012 |

* cited by examiner

MOTOR INCLUDING BRACKETS AND FIXING MEMBERS

BACKGROUND OF THE INVENTION

1. Field of the Invention

The present invention relates to an inner-rotor-type motor.

2. Description of the Related Art

In the field of an inner-rotor-type motor, there has been extensively used a motor having a structure in which bearings are arranged at the axial upper and lower sides of an armature if the axial length of the motor is long.

In the motor of this kind, it is necessary that brackets for supporting the bearings be attached to the upper and lower portions of the armature.

In Japanese Patent No. 4798651, a front end bracket and a rear end bracket extending radially outward beyond the outer periphery portion of a stator core are fixed by screws.

In Japanese Patent No. 4798651, it is possible to avoid the turbulence of magnetic fluxes. However, since the front and rear end brackets extend radially outward beyond the stator core, there is a problem in that the motor becomes larger in size.

SUMMARY OF THE INVENTION

Preferred embodiments of the present invention provide an inner-rotor-type motor having a structure capable of solving the aforementioned technical problem.

According to a preferred embodiment of the present invention, a motor includes a shaft arranged along a center axis extending in an up-down direction, a rotor magnet arranged in an annular shape about the center axis and configured to rotate together with the shaft, an armature arranged to cover the rotor magnet at the radial outer side thereof, an upper bracket fixed to an axial upper portion of the armature, the upper bracket holding an upper bearing to rotatably support the shaft at the radial center thereof, and a lower bracket fixed to an axial lower portion of the armature, the lower bracket holding a lower bearing to rotatably support the shaft at the radial center thereof, wherein the armature includes an annular core-back, a plurality of magnetic pole teeth protruding radially inward from the coreback, an insulator arranged to cover at least upper surfaces and lower surfaces of the magnetic pole teeth and a coil defined by a conductive wire wound around the magnetic pole teeth through the insulator, the insulator including an annular core-back insulating portion arranged radially outward of the coil and extended axially upward, the upper bracket making direct or indirect contact with the core-back insulating portion in an axial direction and making contact with the core-back insulating portion in a radial direction, the upper bracket fixed by a plurality of fixing members positioned radially inward of an outer circumferential surface of the core-back.

According to a preferred embodiment of the present invention, it is possible to accurately position the armature and the upper bracket. As a result, it becomes possible to secure the coaxiality of the bearings and the center axis. Moreover, it is possible to secure the volume occupied by the armature in the outer form of the motor. This makes it possible to increase the efficiency with respect to the outer form of the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to the drawings. In the following description, the direction extending along the center axis of a motor will be referred to as "up-down direction". The shape and positional relationship of individual components will be described under the assumption that the side of a core-back insulating portion with respect to a stator core is an upper side. However, the up-down direction is defined merely for the sake of convenience of description. The definition of the up-down direction is not intended to limit the in-use posture of the motor according to preferred embodiments of the present invention.

The motor of the present preferred embodiment is preferably mounted to an electric appliance such as, for example, an air conditioner, an air cleaner, or a refrigerator and is used as a drive power source of a fan or a pump. The present motor can also alternatively be used as a drive power source of an industrial device such as a sorter or the like. However, the motor of the present preferred embodiment may also be used in other applications. For example, the present motor may be mounted to an OA (Office Automation) device, a medical instrument, or a motor vehicle to generate different kinds of drive power. In the following description, the device to which a motor 1 is mounted will be referred to as "drive device".

Figure 1:
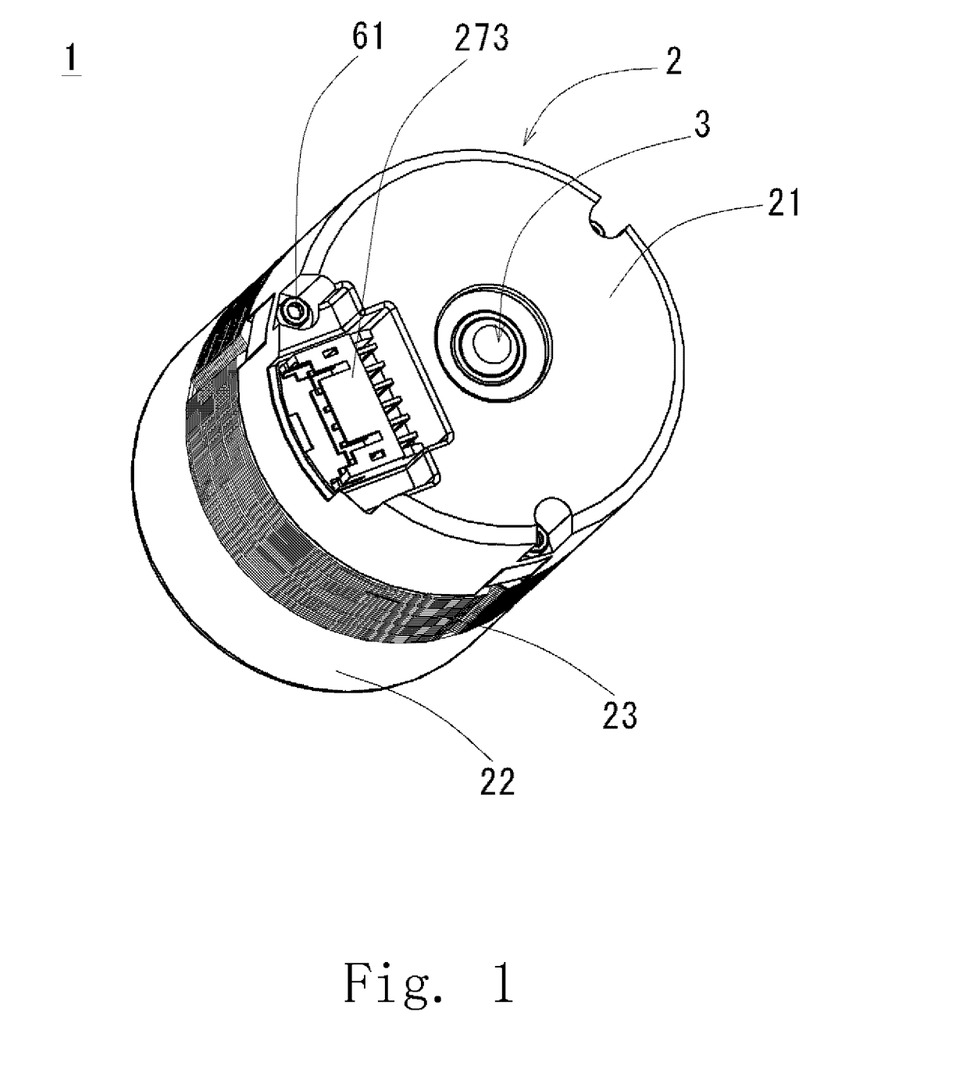
FIG. 1 is a perspective view showing the external appearance of a motor according to a preferred embodiment of the present invention.
Figure 2:
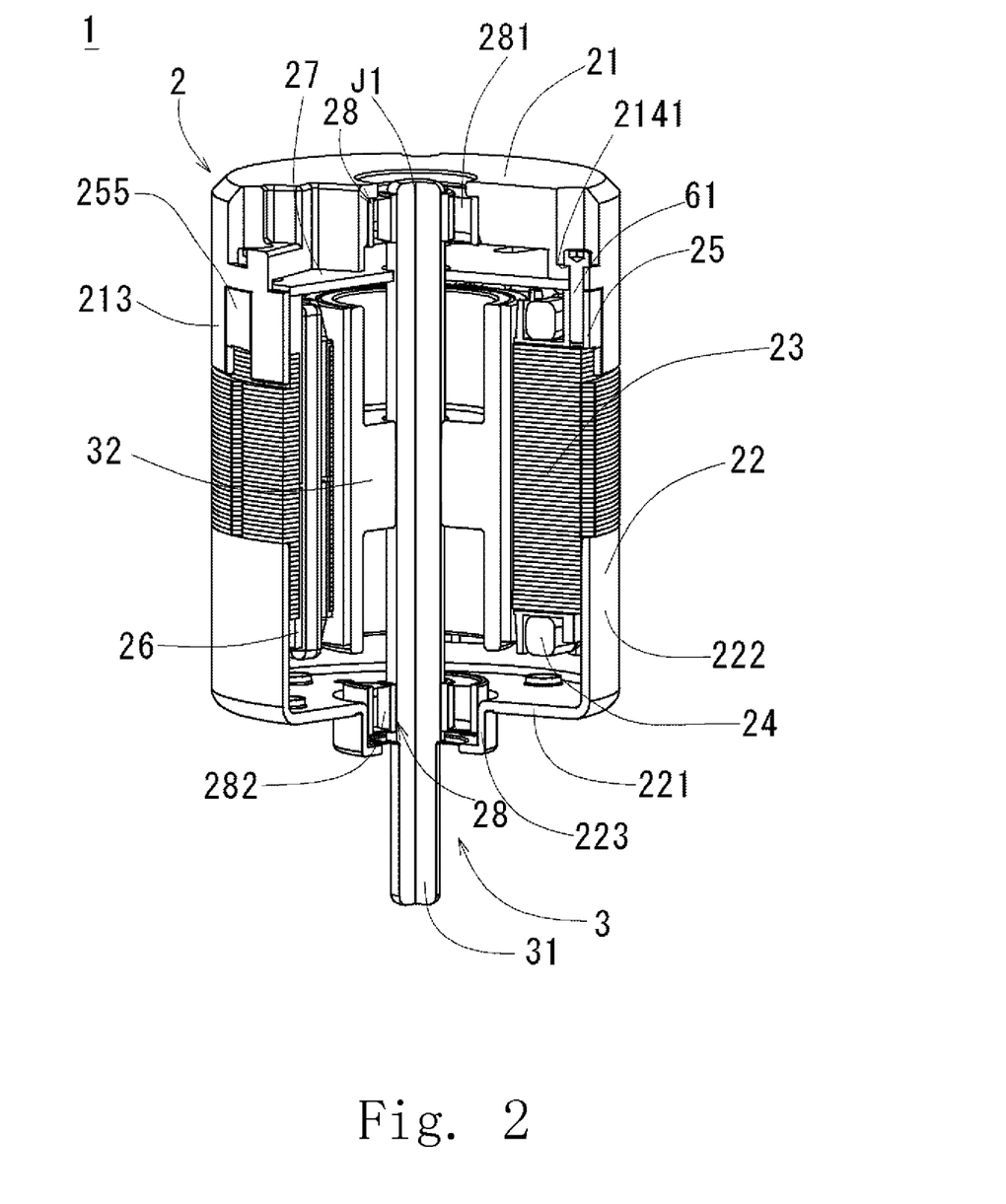
FIG. 2 is a three-dimensional sectional view of the motor according to a preferred embodiment of the present invention.
Figure 3:
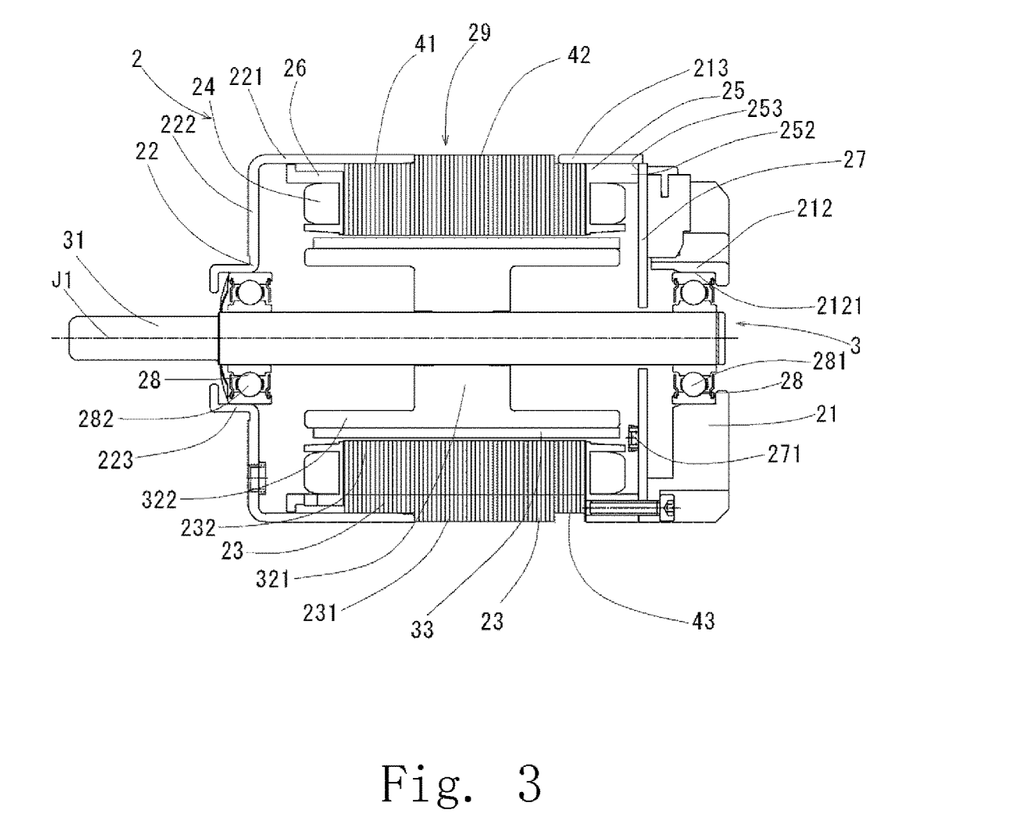
FIG. 3 is a sectional view of the motor according to a preferred embodiment of the present invention.

FIG. 1 is a perspective view showing the external appearance of a motor 1. FIG. 2 is a three-dimensional section view of the motor 1. FIG. 3 is a section view of the motor 1. As shown in FIGS. 1 through 3, the motor 1 preferably includes a stationary unit 2 and a rotary unit 3. The stationary unit 2 is preferably fixed to a frame of a drive device (not shown). The rotary unit 3 is rotatably supported with respect to the stationary unit 2.

The stationary unit 2 of the present preferred embodiment preferably includes an upper bracket 21, a lower bracket 22, a stator core 23, a coil 24, an upper insulator 25, a lower insulator 26, a circuit board 27, and a bearing unit 28.

The upper bracket 21 is preferably arranged to hold the stator core 23 and the bearing unit 28 (an upper bearing 281) in place. More specifically, the upper bracket 21 is preferably brought into contact with the upper insulator 25 and is fixed by a plurality of fixing members 61, so as to hold the stator core in place. The upper bracket 21 has a cylindrical or substantially cylindrical shape with a closed top. The upper bracket 21 is preferably a member made of a metal. The upper bracket 21 is preferably obtained by, for example, a so-called die-casting method in which the upper bracket 21 is molded by melting a metal mainly composed of zinc and pouring the molten metal into a mold. The kind of the metal is not limited to zinc. It may be possible to use aluminum or other metals, for example. The upper bracket 21 may not be produced by the die-casting method but may alternatively be processed by other processing methods such as, for example, a pressing method and the like. The upper bracket 21 may also be made of a resin and not a metal, if so desired.

The lower bracket 22 preferably holds the stator core 23 and the bearing unit 28 (a lower bearing 282) in place. The lower bracket 22 is a member made of a metal. The lower bracket preferably includes a bottom portion 221, a large-diameter cylinder portion 222, and a small-diameter cylinder portion 223. The bottom portion 221 is preferably a planar or substantially planar portion lying below the coil 24 and extending in the radial direction (the direction orthogonal to the center axis, which holds true herein below). The large-diameter cylinder portion 222 is preferably a cylindrical or substantially cylindrical portion extending upward from the outer periphery portion of the bottom portion 221. The small-diameter cylinder portion 223 is a cylindrical or substantially cylindrical portion extending downward from the radial inner edge of the bottom portion 221. When attaching the motor 1 to a drive device, the outer circumferential surface of the small-diameter cylinder portion 223 is fitted to the frame of the drive device. This makes it possible to easily position the motor 1 and the drive device. In the bottom portion 221, a plurality of holes is preferably arranged along the circumferential direction. The motor 1 is preferably fixed to the drive device by, for example, inserting screws through the holes.

The lower bracket 22 is preferably made of a metal which is not an electromagnetic steel plate. The lower bracket 22 of the present preferred embodiment is preferably obtained by pressing an alloy metal plate mainly composed of iron. In other words, the lower bracket 22 is preferably a monolithic press-formed article including a bottom portion 221, a large-diameter cylinder portion 222, and a small-diameter cylinder portion 223. As compared with other methods such as casting and cutting, the pressing is suitable for mass production. In the present preferred embodiment, the stator core 23 and the bearing unit 28 (the lower bearing 282) are preferably held in place by the lower bracket 22 as a monolithic member. Accordingly, it is possible to accurately position the stator core 23 and the below-mentioned shaft 31 with respect to each other.

The stator core 23 and the coil 24 are portions serving as an armature of the motor. The stator core 23 is defined by laminated steel plates obtained by laminating electromagnetic steel plates, e.g., silicon steel plates, in the axial direction (the direction extending along the center axis J1 which holds true herein below). The stator core 23 preferably includes an annular core-back 231 and a plurality of magnetic pole teeth 232 protruding radially inward from the core-back 231. The core-back 231 is held in the large-diameter cylinder portion 222 of the lower bracket 22. The outer circumferential surface of the core-back 231 becomes the outer circumferential surfaces of a lower small-diameter portion 41, a large-diameter portion 42 and an upper small-diameter portion 43, which will be described later. The circumferential width of the portion of each of the magnetic pole teeth 232 of the stator core 23 around which the coil 24 is wound is preferably equal to or less than about two times of the radial width of the core-back 231.

The coil 24 is preferably defined by conductive wires wound around the magnetic pole teeth 232. The coil 24 is wound on the magnetic pole teeth 232 through an insulator. When a drive current is applied to the coil 24, radial magnetic fluxes are generated in the magnetic pole teeth 232 as magnetic cores. Then, circumferential torque is generated by the action of the magnetic fluxes between the magnetic pole teeth 232 and the rotor magnet 33 of the rotary unit 3. As a result, the rotary unit 3 rotates about the center axis J1 with respect to the stationary unit 2.

The upper insulator 25 and the lower insulator 26 are preferably resin-made members which electrically insulate the stator core 23 and the coil 24. The upper insulator 25 is arranged on the upper side of the stator core 23. The lower insulator 26 is arranged on the lower side of the stator core 23. In other words, the stator core 23 is interposed between the upper insulator 25 and the lower insulator 26. The upper insulator 25 covers the upper surfaces of the magnetic pole teeth 232. The lower insulator 26 covers the lower surfaces of the magnetic pole teeth 232. The upper insulator 25 and the lower insulator 26 cover the side surfaces of the magnetic pole teeth 232. The upper insulator 25 and the lower insulator 26 define an insulator. In the present preferred embodiment, the coil 24 is preferably wound around the magnetic pole teeth 232 through the upper insulator 25 and the lower insulator 26, whereby the insulator is fixed to the stator core 23.

The upper insulator 25 and the lower insulator 26 include portions existing between the magnetic pole teeth 232 and the coil 24 and electrically insulating the magnetic pole teeth 232 and the coil 24. The upper insulator 25 includes an annular core-back insulating portion 252 existing radially outward of the coil 24 and continuously extending in the circumferential direction. The core-back insulating portion 252 is arranged above the large-diameter portion 42 and radially outward of the coil 24. The core-back insulating portion 252 is a portion for insulating the coil 24 from other members when the winding of the coil 24 is collapsed. The assembly of the stator core 23, the coil 24, the upper insulator 25 and the lower insulator 26 is defined as an armature 29.

Figure 4:
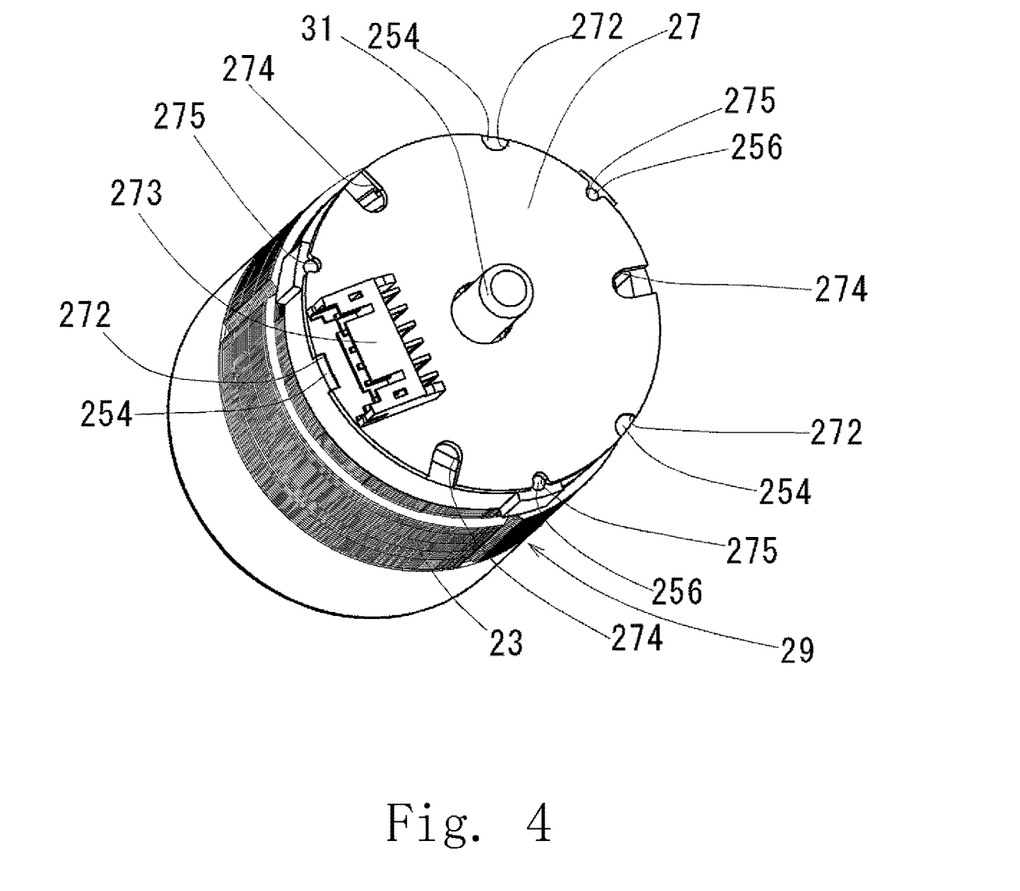
FIG. 4 is a perspective view showing the external appearance of the motor according to a preferred embodiment of the present invention with the upper bracket removed from the motor.

FIG. 4 is a perspective view showing the external appearance of the motor with the upper bracket 21 removed from the motor 1. Referring to FIG. 4, the circuit board 27 is preferably a board mounted with an electronic circuit arranged to apply a drive current to the coil 24. The circuit board 27 has a disc shape or substantial disc shape when seen in a plan view. The outer periphery of the circuit board 27 preferably coincides or substantially coincides with the outer periphery of the upper small-diameter portion 43 of the stator core 23 to be described later. The circuit board 27 is preferably fixed to a seat surface 253, i.e., the upper surface, of the upper insulator 25. A magnetic sensor 271 arranged to detect the revolution number of the rotary unit 3 is provided on the lower surface of the circuit board 27. For example, a Hall sensor is preferably used as the magnetic sensor 271.

Cutouts depressed radially inward from the outer circumference are arranged on the outer circumferential surface of the circuit board 27. The cutouts are preferably positioning portions 272. The positioning lug portions 254 of the upper insulator 25 (to be described later) are inserted into the positioning portions 272. Therefore, when the circuit board 27 is caused to move with respect to the upper insulator 25, the positioning lug portions 254 come into contact with the positioning portions 272, preventing the movement of the circuit board 27. Consequently, it becomes possible to accurately perform the circumferential and radial positioning of the upper insulator 25 and the circuit board 27. The positioning portions 272 may alternatively be through-holes, if so desired.

A connector 273 is preferably provided on the upper surface of the circuit board 27. The motor 1 obtains a drive current via the connector 273. Cutouts depressed radially inward from the outer circumference are arranged on the outer circumferential surface of the circuit board 27. The cutouts are winding wire passage portions 274. The ends of the conductive wires of the coil 24 are led out onto the upper surface of the circuit board 27 through the winding wire passage portions 274 and are preferably soldered to lands arranged on the upper surface of the circuit board 27. In the present preferred embodiment, the winding wire passage portions 274 are preferably arranged at three points along the circumferential direction, for example. This is because the motor 1 of the present preferred embodiment is a three-phase brushless motor such that there is a need to solder the conductive wires of U, V, and W phases. Cutouts depressed radially inward from the outer circumference are defined on the outer circumferential surface of the circuit board 27. The cutouts are preferably fixing member passage portions 275. The fixing member passage portions 275 include surfaces corresponding to the plan-view projection shape of the thread portions of the fixing members (the screws 61) to be described later.

Referring to FIGS. 2 and 3, the bearing unit 28 is a member arranged to rotatably support the shaft 31 of the rotary unit 3. The bearing unit 28 preferably includes an upper bearing 281 and a lower bearing 282. The upper bearing 281 is preferably held on the inner circumferential surface 2121 of the holding portion 212 of the upper bracket 21. The lower bearing 282 is preferably held on the inner circumferential surface of the small-diameter cylinder portion 223 of the lower bracket 22. For example, a ball bearing in which an inner race and an outer race are rotated relative to each other through balls is preferably used as the bearing unit 28. Other types of bearings such as, for example, a slide bearing and a fluid bearing may alternatively be used as the bearing unit 28.

The rotary unit 3 of the present preferred embodiment preferably includes a shaft 31, a rotor holder 32 and a rotor magnet 33. The shaft 31 is a cylindrical or substantially cylindrical columnar member extending in the up-down direction along the center axis J1. The shaft 31 is preferably supported by the bearing unit 28 and is rotated about the center axis J1. The lower end portion of the shaft 31 protrudes downward beyond the lower bracket 22. The upper end portion of the shaft 31 preferably protrudes upward beyond the circuit board 27. The lower end portion or the upper end portion of the shaft 31 is connected to a drive unit of a drive device via a power transfer mechanism such as, for example, gears or the like. Alternatively, the drive unit of the drive device may be directly driven by the shaft 31.

The rotor holder 32 is a member existing radially inward of the stator core 23 and the coil 24 and rotating together with the shaft 31. The rotor holder 32 of the present preferred embodiment is preferably made of, for example, free-cutting steel. The rotor holder 32 is preferably formed by cutting, for example. The rotor holder 32 preferably has an H-shaped or a substantially H-shaped cross section and includes a central portion 321 and a tubular portion 322. The central portion 321 is positioned at the axial center of the rotor holder 32. The shaft 31 is preferably press-fitted to the inner circumferential surface of the central portion 321. The tubular portion 322 is positioned radially outward of the central portion 321. The tubular portion 322 is preferably a cylindrical or a substantially cylindrical portion extending axially upward and downward from the central portion 321.

While the rotor holder 32 has an H-shaped or substantially H-shaped cross-section in the present preferred embodiment, the shape of the rotor holder 32 is not limited thereto. The shape of the rotor holder 32 may be just cylindrical. The rotor holder 32 may be arranged into a substantially cylindrical shape with a closed top and may be produced by press working. The rotor holder 32 may alternatively be produced by laminating magnetic steel plates one above another, or the rotor holder 32 may be produced by sintering.

The rotor magnet 33 preferably has a cylindrical or substantially cylindrical shape and is fixed to the outer circumferential surface of the tubular portion 322 of the rotor holder 32. The radial outer surface of the rotor magnet 33 is defined by magnetic pole surfaces radially facing the stator core 23 and the coil 24. The rotor magnet 33 is magnetized such that the magnetic pole surfaces of N-pole and the magnetic pole surfaces of S-pole are alternately arranged along the circumferential direction. The rotor magnet 33 may alternatively not be defined by a cylindrical or substantially cylindrical magnet but may be defined by arranging a plurality of magnets so that N-poles and S-poles can be alternately arranged along the circumferential direction.

Figure 5:
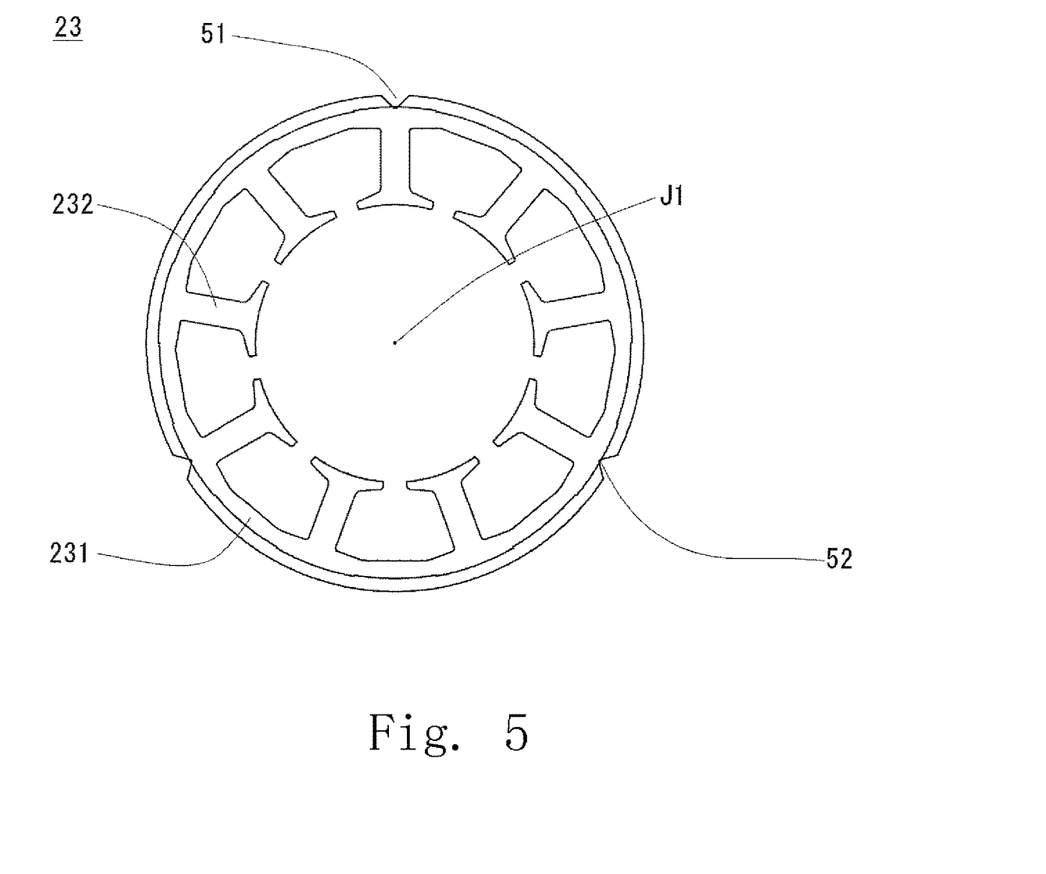
FIG. 5 is a bottom view of the stator core according to a preferred embodiment of the present invention.
Figure 6:
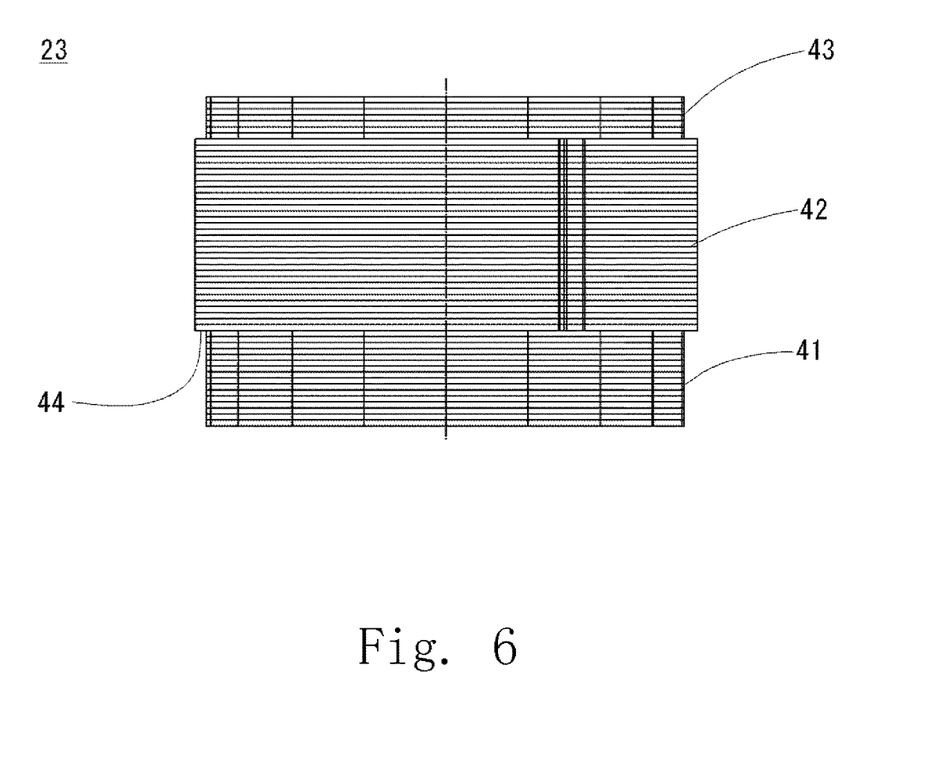
FIG. 6 is a side view of the stator core according to a preferred embodiment of the present invention.

Subsequently, description will be made on the detailed structure of the stator core 23. FIG. 5 is a bottom view of the stator core 23. FIG. 6 is a side view of the stator core 23.

As shown in FIGS. 2 through 6, the outer circumferential surface of the stator core 23 preferably includes a lower small-diameter portion 41, a large-diameter portion 42, and an upper small-diameter portion 43. The lower small-diameter portion 41 has a cylindrical or substantially cylindrical outer circumferential surface. The lower small-diameter portion 41 is preferably, for example, press-fitted to the radial inner side of the large-diameter cylinder portion 222 of the lower bracket 22. In other words, the lower small-diameter portion 41 is fixed to the inner circumferential surface of the large-diameter cylinder portion 222. The large-diameter portion 42 is arranged above the lower small-diameter portion 41. The large-diameter portion 42 has a cylindrical or substantially cylindrical outer circumferential surface larger in diameter than the outer circumferential surface of the lower small-diameter portion 41.

The upper small-diameter portion 43 is preferably arranged above the large-diameter portion 42. The upper small-diameter portion 43 preferably has a cylindrical or substantially cylindrical outer circumferential surface smaller in diameter than the outer circumferential surface of the large-diameter portion 42. In other words, the upper small-diameter portion 43 is smaller in outer form than the large-diameter portion 42. In the present preferred embodiment, the diameter of the outer circumferential surface of the upper small-diameter portion 43 is equal to the diameter of the outer circumferential surface of the lower small-diameter portion 41. The outer circumferential surface of the upper extension of the upper small-diameter portion 43 makes contact with the protrusion portion 213 of the upper bracket 21.

If the diameter of the outer circumferential surface of the upper small-diameter portion 43 is preferably made equal to the diameter of the outer circumferential surface of the lower small-diameter portion 41, the mold arranged to mold the upper small-diameter portion 43 and the mold arranged to mold the lower small-diameter portion 41 can be the same shape. This eliminates the need to use an additional mold.

The outer circumferential surface of the large-diameter portion 42 is preferably not covered with the large-diameter cylinder portion 222 and the protrusion portion 213 and is exposed from the lower bracket 22 and the upper bracket 21. As compared with a case where the entirety of the outer circumferential surface of the stator core 23 is covered with the lower bracket 22 and the upper bracket 21, it is possible in the present preferred embodiment to reduce the area over which the outer circumferential surface of the stator core 23 faces the lower bracket 22 and the upper bracket 21. For that reason, even if the lower bracket 22 and the upper bracket 21 are magnetic bodies, magnetic fluxes are preferably only barely leaked from the outer circumferential surface of the large-diameter portion toward the lower bracket 22 and the upper bracket 21. Accordingly, it is possible to reduce the iron loss caused by the lower bracket 22 and the upper bracket 21, so as to increase the energy efficiency of the motor 1.

The outer circumferential surface of the large-diameter portion 42 protrudes radially outward to the radial position where the outer circumferential surface of the large-diameter portion 42 becomes flush or substantially flush with the outer circumferential surface of the large-diameter cylinder portion 222 and the outer circumferential surface of the protrusion portion 213. In other words, the outer circumferential surface of the large-diameter portion 42 preferably becomes the outermost diameter portion of the core-back 231. Therefore, as compared with a case where the protrusion is absent, the magnetic path within the core-back 231 is enlarged in the radial direction. Accordingly, it is possible to suppress magnetic saturation occurring in the stator core 23, which assists in reducing the iron loss of the core-back 231 in the large-diameter portion 42. It is therefore possible to further enhance the energy efficiency of the motor 1.

If the outer diameter of the large-diameter portion 42 grows larger, it becomes possible to increase the inner diameter of the stator core 23 while maintaining the size of the magnetic path defining a region within the stator core 23. If the inner diameter of the stator core 23 is increased, it becomes possible to increase the radial dimension of the rotary unit 3 just as much as the increase in the inner diameter of the stator core 23. This makes it possible to increase the torque of the rotary unit 3.

The large-diameter portion 42 may protrude radially outward beyond the outer circumferential surface of the large-diameter cylinder portion 222 and the outer circumferential surface of the protrusion portion 213. However, if the outer circumferential surface of the large-diameter portion 42 and the outer circumferential surface of the large-diameter cylinder portion 222 are arranged in the same radial position as in the present preferred embodiment, it is preferably possible to prevent the motor 1 from growing larger in size and to prevent the outer circumferential surface of the motor 1 from becoming irregular.

The large-diameter cylinder portion 222 of the lower bracket 22 covers only the outer circumferential surface of the lower small-diameter portion 41 of the stator core 23. Therefore, as compared with a case where the large-diameter cylinder portion 222 covers the entirety of the outer circumferential surface of the stator core 23, the axial length of the large-diameter cylinder portion 222 becomes shorter. As a consequence, the material of the lower bracket 22 can preferably be saved and the lower bracket 22 becomes easy to process. In particular, if the lower bracket 22 is a press-formed article as is preferably the case in the present preferred embodiment, the shortened length of the large-diameter cylinder portion 222 to be formed by a drawing work significantly enhances the ease of processing.

The stator core 23 of the present preferred embodiment preferably includes a step surface 44 arranged between the outer circumferential surface of the lower small-diameter portion 41 and the outer circumferential surface of the large-diameter portion 42. The step surface 44 and the upper end portion of the large-diameter cylinder portion 222 face each other with a gap left therebetween. Thus, the axial position of the stator core with respect to the lower bracket 22 is decided. A positioning jig is preferably used in manufacturing the motor 1. The stator core 23 is press-fitted in such a way that the step surface 44 and the upper end portion of the large-diameter cylinder portion 222 should not make contact with each other. Therefore, even if there are variations in the lamination of the magnetic steel plates of the stator core 23, it is possible to axially position the lower bracket 22 and the stator core 23.

The axial dimension of the stator core 23 is set depending on the required characteristics of the motor 1. At this time, if the dimension of the large-diameter portion 42 is increased or decreased while keeping constant the dimension of at least one of the lower small-diameter portion 41 and the upper small-diameter portion 43, it is preferably possible to change the axial dimension of the stator core 23 without having to change the size of at least one of the lower bracket 22 and the upper bracket 21. In other words, if the structure of the stator core 23 of the present preferred embodiment is used, it is possible to use at least one of the lower bracket 22 and the upper bracket 21 of the same kind with respect to different kinds of stator cores 23. If the dimension of the large-diameter portion 42 is increased, namely if the laminated number of the magnetic steel plates of the large-diameter portion 42 is increased, it becomes possible to increase the output power of the motor 1.

In the stator core 23 of the present preferred embodiment, the axial dimension of the large-diameter portion 42 is larger than the axial dimension of the lower small-diameter portion 41. Moreover, the axial dimension of the large-diameter portion 42 is larger than the axial dimension of the upper small-diameter portion 43. In this example, much emphasis is placed on the effect of reducing the iron loss. If one wishes to increase the fixing strength of at least one of the lower bracket 22 and the upper bracket 21 with respect to the stator core 23 while obtaining the iron loss reduction effect, the axial dimension of at least one of the lower small-diameter portion 41 and the upper small-diameter portion 43 may be set larger than the axial dimension of the large-diameter portion 42.

Figure 7:
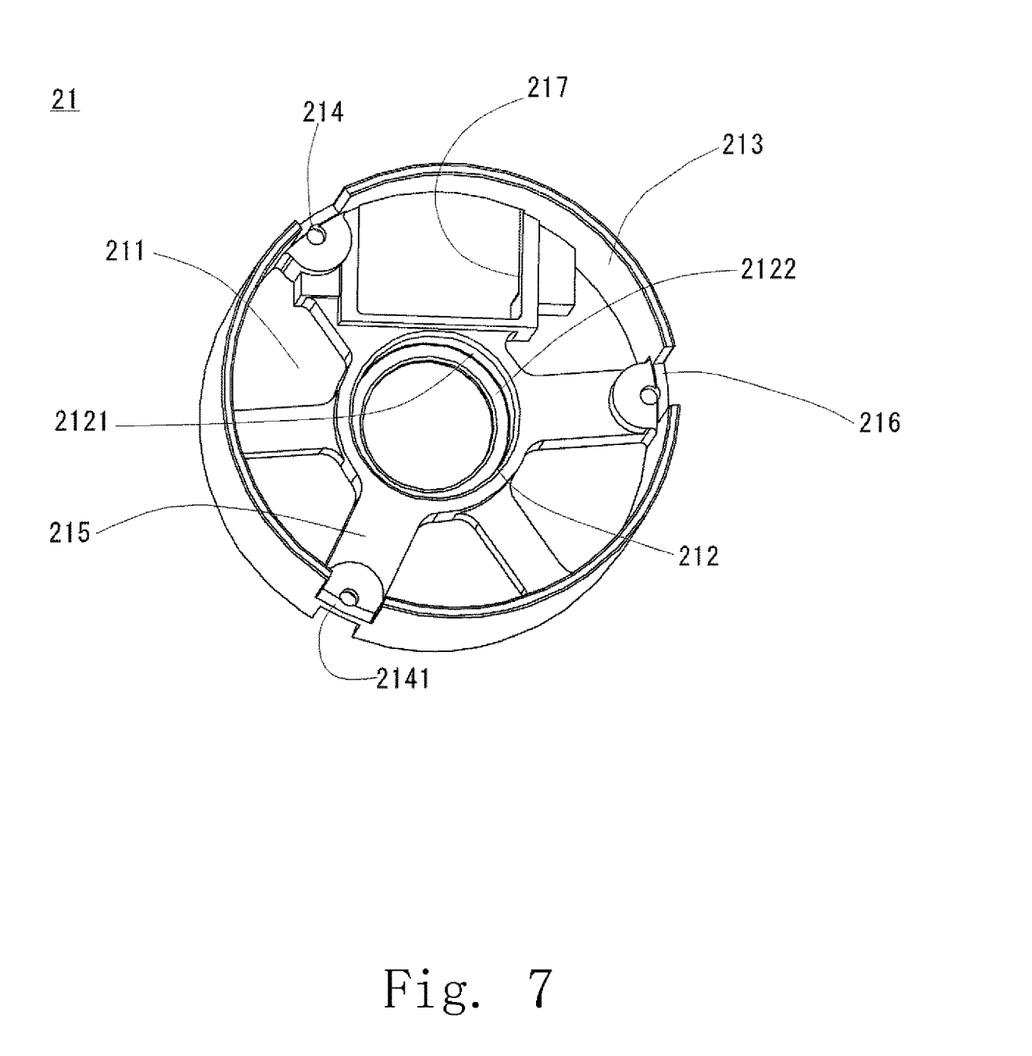
FIG. 7 is a perspective view of the upper bracket according to a preferred embodiment of the present invention.

First, the upper bracket 21 will be described in detail. FIG. 7 is a perspective view of the upper bracket 21. Referring to FIG. 7, the upper bracket 21 preferably includes a cover portion 211, a holding portion 212, a protrusion portion 213, a plurality of through-holes 214, a rib 215, a plurality of depressed portions 216, and an opening 217. The cover portion 211 is preferably arranged into a flat shape and is positioned axially above the circuit board 27. The holding portion 212 is a recess portion positioned radially inward of the cover portion 211 and opened axially downward. The holding portion 212 preferably includes a cylindrical inner circumferential surface 2121 and an annular top surface 2122. The inner circumferential surface 2121 preferably makes contact with the outer circumferential surface of the outer race of the upper bearing 281. The top surface 2122 preferably makes contact with the upper end surface of the outer race of the upper bearing 281. Thus, the holding portion 212 is arranged to hold the upper bearing 281 in place.

The protrusion portion 213 is arranged to protrude axially downward from the radial outer edge of the cover portion 211. The protrusion portion 213 preferably has an annular or a substantially annular shape. Furthermore, the protrusion portion 213 preferably has a cylindrical or a substantially cylindrical shape. The inner circumferential surface of the protrusion portion 213 makes contact with the outer circumferential surface of the upper small-diameter portion 43 of the stator core 23. This makes it possible to enhance the coaxiality of the center axis J1 and the upper bearing 281. It is also possible to enhance the rigidity of the upper bracket 21. The inner circumferential surface of the protrusion portion 213 may make contact with the outer circumferential surface of the circuit board 27 or the outer circumferential surface of the upper insulator 25. If the inner circumferential surface of the protrusion portion 213 makes contact with the circuit board 27 or the upper insulator 25, it becomes possible to further enhance the rigidity of the upper bracket 21. Below the lower ends of the raised portions 255 of the upper insulator 25, the protrusion portion 213 extends in the circumferential direction.

The through-holes 214 are arranged along the circumferential direction in the radial outer region of the cover portion 211. In the present preferred embodiment, the number of the through-holes 214 is preferably three. The fixing members 61 are inserted into the respective through-holes 214. In the present preferred embodiment, the fixing members 61 are preferably screws (hereinafter referred to as "screws 61" if such a need arises). Seat surfaces 2141 are preferably arranged around the through-holes 214. The seat surfaces 2141 are positioned axially below the cover portion 211. The heads of the screws 61 make contact with the seat surfaces 2141. In other words, the fixing members 61 include lower surfaces making contact with the upper surface of the upper bracket 21. This makes it possible to prevent the screws 61 from protruding axially upward from the cover portion 211 when the screws 61 are tightened. Accordingly, it becomes possible to reduce the thickness of the motor 1. The diameter of the thread portions of the screws 61 is preferably equal to or a little smaller than the diameter of the through-holes 214. Thus, after the screws 61 are tightened, the upper bracket 21 is prevented from moving in the circumferential direction with respect to the armature 29. Accordingly, it becomes possible to strongly fix the upper bracket 21 and the armature 29 to each other. The fixing members 61 may alternatively be rivets, for example. The lower ends of the screws 61 may make contact with the upper end of the stator core 23. A grounding pattern may be defined around the fixing member passage portions 275 of the circuit board 27. This enables the screws 61 to perform electrical grounding.

The rib 215 is preferably provided on the lower surface of the cover portion 211, namely on the surface of the cover portion 211 facing the circuit board 27. In the present preferred embodiment, the rib 215 extends in a radial pattern. When seen in a plan view, the rib 215 is preferably arranged to overlap with the through-holes 214. Therefore, despite the formation of the through-holes 214, it is possible to prevent reduction of the rigidity of the upper bracket 21. The radially extending portions of the rib 215 are connected to one another in an annular shape at the center of the upper bracket 21. The annular portion of the rib 215 is connected to the holding portion 212. This makes it possible to increase the rigidity of the upper bracket 21. Moreover, it is possible for the upper bracket 21 to reliably withstand the load applied to the upper bearing 281 held in the holding portion 212.

In case where electronic parts generating a large amount of heat are mounted on the circuit board 27, it is preferred that the rib 215 is arranged to face the electronic parts. This makes it possible to shorten the distance between the electronic parts and the rib 215 (the upper bracket 21). As a result, the heat generated in the electronic parts can be dissipated from the upper bracket 21 through the rib 215. A heat transfer material such as, for example, silicon or the like may be interposed between the electronic parts and the rib 215. This further accelerates the heat dissipation from the electronic parts. Examples of the electronic parts generating an increased amount of heat include, for example, a field effect transistor (FET).

The depressed portions 216 are portions of the protrusion portion 213 and are depressed axially upward. More specifically, the depressed portions 216 are depressed axially upward from the lower end of the protrusion portion 213. The depressed portions 216 are arranged to circumferentially overlap with the through-holes 214. The raised portions 255 of the upper insulator 25 are positioned inside the depressed portions 216. The circumferential width of the depressed portions 216 is preferably equal or substantially equal to the circumferential width of the raised portions 255. The depressed portions 216 and the raised portions 255 are fitted to each other. In other words, the side surfaces of the depressed portions 216 make contact with the side surfaces of the raised portions 255. This makes it easy to position the upper bracket 21 and the upper insulator 25. It is also possible to strongly fasten the upper bracket 21 and the upper insulator 25 together and to increase the rigidity of the stationary unit 2. In the present preferred embodiment, the lower end surfaces of the depressed portions 216 do not make contact with the upper end surfaces of the raised portions 255. This is because the upper bracket 21 and the upper insulator 25 make indirect contact with each other through the circuit board 27 in the axial direction. However, the lower end surfaces of the depressed portions 216 may make contact with the upper end surfaces of the raised portions 255. In addition, the upper bracket 21 and the upper insulator 25 may make direct contact with each other with no intervention of the circuit board 27.

The opening 217 is preferably a through-hole arranged to extend from the cover portion 211 to the protrusion portion 213. The connector 273 mounted on the circuit board 27 is exposed from the opening 217. The motor 1 is connected to the connector 273 through the opening 217. Thus, the electric power is supplied to the motor 1.

Figure 8:
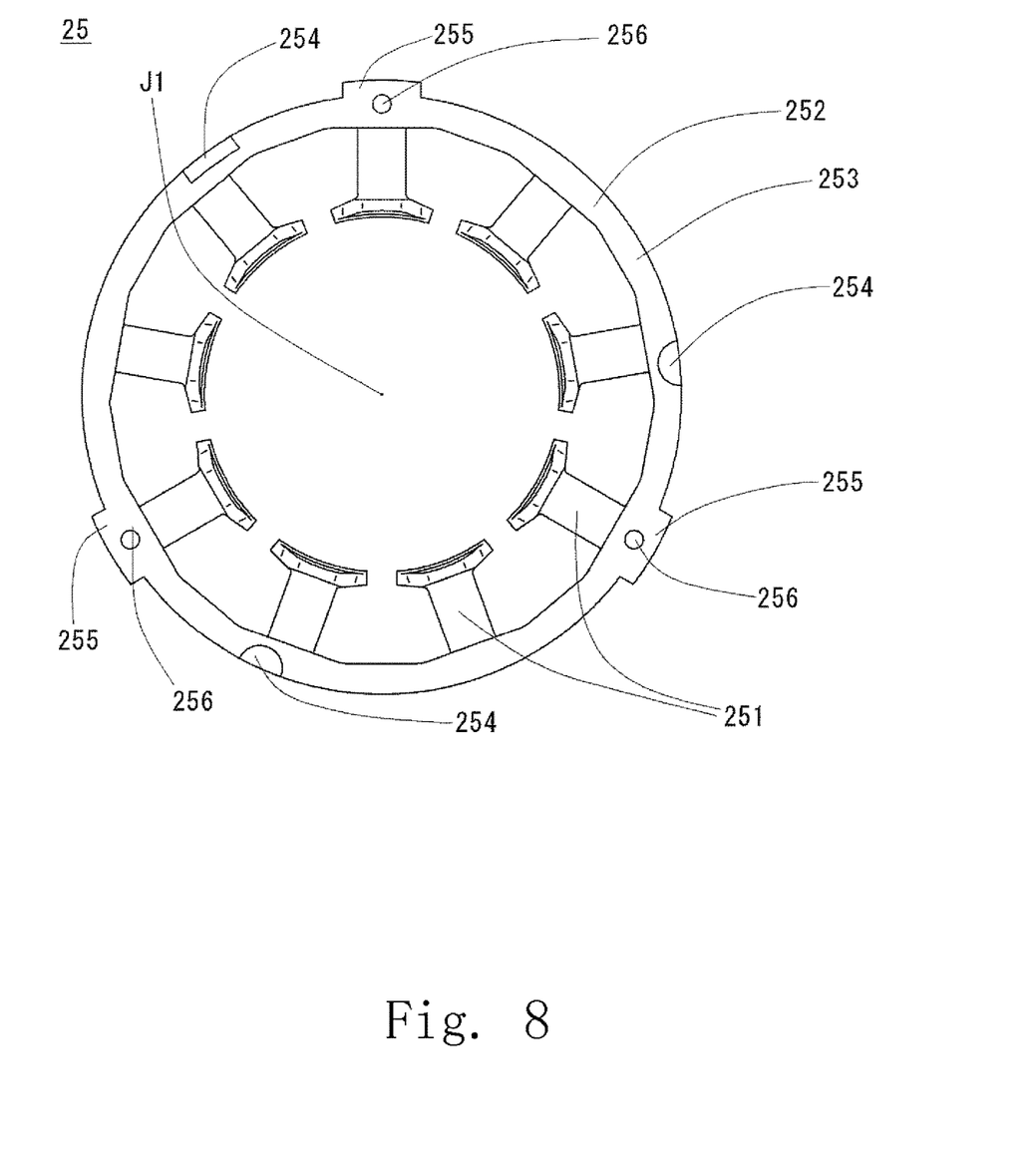
FIG. 8 is a plan view of the upper insulator according to a preferred embodiment of the present invention.

FIG. 8 is a plan view of the upper insulator 25. The shape of the upper insulator 25 will be described in detail with reference to FIG. 8. The upper insulator 25 preferably includes a plurality of magnetic-pole-tooth insulating portions 251 and a core-back insulating portion 252. The magnetic-pole-tooth insulating portions 251 cover the upper surfaces and the side surfaces of the respective magnetic pole teeth 232. The core-back insulating portion 252 preferably has an annular shape and interconnects the respective magnetic-pole-tooth insulating portions 251. The radial position of the outer circumferential surface of the core-back insulating portion 252 preferably coincides with or substantially coincides with the radial position of the outer circumferential surface of the upper small-diameter portion 43 of the core-back 231. The core-back insulating portion 252 extends axially upward at the radial outer side of the coil 24. The upper end surface of the core-back insulating portion 252 is positioned axially above the coil 24. Accordingly, it is possible to prevent the coil 24 from interfering with the circuit board 27, the upper bracket 21 and other members.

The core-back insulating portion 252 preferably includes a seat surface 253, a plurality of positioning protrusion portions 254, a plurality of raised portions 255, and a plurality of fixed portions 256. The seat surface 253 is an upper surface of the core-back insulating portion 252 and a planar surface perpendicular or substantially perpendicular to the center axis J1. The seat surface 253 makes contact with the lower surface of the circuit board 27. The positioning protrusion portions 254 are arranged to protrude axially upward from the seat surface 253. The positioning protrusion portions 254 are accommodated within the positioning portions 272 of the circuit board 27. In the present preferred embodiment, the positioning protrusion portions 254 are preferably provided at three points in a spaced-apart relationship along the circumferential direction. While the positioning protrusion portions 254 are preferably arranged at three points in the present preferred embodiment, the present invention is not limited thereto. The positioning protrusion portions 254 may alternatively be arranged at one, two, four, or more points. The raised portions 255 protrude radially outward from the core-back insulating portion 252. In other words, the outer surfaces of the raised portions 255 are positioned radially outward beyond the outer circumferential surface of the upper small-diameter portion 43. Accordingly, the raised portions 255 protrude radially outward beyond the coil 24. In the present preferred embodiment, the outer surfaces of the raised portions 255 are preferably flush or substantially flush with the outer surface of the large-diameter portion 42. The raised portions 255 have side surfaces parallel or substantially parallel to the radial direction. Therefore, when the raised portions 255 and the depressed portions 216 are fitted to each other, it is possible to reliably prevent the upper insulator 25 from moving in the circumferential direction.

The fixed portions 256 are preferably through-holes defined in the raised portions 255. The screws 61 are inserted into the fixed portions 256. The diameter of the fixed portions 256 is equal or substantially equal to the diameter of the thread portions of the screws 61. The fixed portions 256 may not be through-holes but may be blind holes opened axially upward.

Next, description will be made on the fixing of the armature 29, the circuit board 27, and the upper bracket 21. The assembly of the stator core 23, the coil 24, the upper insulator 25, and the lower insulator 26 is defined as an armature 29.

First, the lower bracket 22 is preferably, for example, press-fitted to the armature 29. Then, the rotary unit 3 is arranged inside the armature 29.

Next, the circuit board 27 is placed on the seat surface 253 of the armature 29. At this time, the circuit board 27 is placed so that the positioning protrusion portions 254 can be inserted into the positioning portions 272 of the circuit board 27. This makes it possible to accurately perform the positioning of the circuit board 27 with respect to the armature 29. It is therefore possible to accurately arrange the magnetic sensor 271 mounted on the circuit board 27.

Next, the upper bracket 21 is placed on the circuit board 27. At this time, the upper bracket 21 is placed so that the raised portions 255 of the upper insulator 25 can be fitted to the depressed portions 216 of the upper bracket 21. Furthermore, upper bracket 21 is placed so that the inner circumferential surface of the protrusion portion 213 of the upper bracket 21 can make contact with the upper small-diameter portion 43 of the stator core 23. This makes it possible to accurately perform the circumferential and radial positioning of the upper bracket 21 and the armature 29. As a result, the upper bearing 281 supported by the upper bracket 21 and the armature 29 can be accurately arranged with increased coaxiality. At this time, the plan-view positions of the through-holes 214, the fixing member passage portions 275 and the fixed portions 256 coincide with one another. It is therefore possible to easily insert the screws 61.

Finally, the screws 61 are inserted into the fixed portions 256. The screws 61 are inserted through the through-holes 214 and the fixing member passage portions 275. In the present preferred embodiment, the screws 61 are inserted in a state that an adhesive agent, for example, is preferably applied on the thread portions of the screws 61. After the insertion of the screws 61, the heads of the screws 61 make contact with the seat surfaces 2141. Thereafter, the adhesive agent is solidified and the screws 61 are fixed to the fixed portions 256. In other words, the lower portions of the fixing members 61 are fixed to the upper insulator 25. Consequently, the circuit board 27 is interposed between the upper bracket 21 and the core-back insulating portion 252. As a result, it is possible to strongly fix the circuit board 27 and the upper bracket 21 to the armature 29.

The upper bearing 281 is positioned axially above the lower ends of the screws 61. This makes it possible to increase the distance between the upper bearing 281 and the lower bearing 282, so as to stably support the shaft 31.

The screws 61 are positioned axially above the upper end of the core-back 231 of the stator core 23. This makes it possible to secure a magnetic space for the stator core 23. As a result, it becomes possible to enhance the energy efficiency of the motor.

As shown in FIGS. 2, 5 and 6, three groove portions 51 are preferably defined on the outer circumferential surface of the stator core 23. The groove portions 51 are used to accurately position the electromagnetic steel plates having different outer diameters in the radial and circumferential directions during the manufacture of the stator core 23.

Each of the groove portions 51 axially extends on the outer circumferential surface of the large-diameter portion 42. Each of the groove portions 51 is preferably depressed radially inward from the outer circumferential surface of the large-diameter portion 42 to have a triangular shape when seen in a plan view. The inner end surfaces 52, i.e., the radial inner boundary surfaces, of the groove portions 51 are preferably arranged in the same radial position as the outer circumferential surfaces of the lower small-diameter portion 41 and the upper small-diameter portion 43. Accordingly, the inner end surfaces 52, the outer circumferential surfaces of the lower small-diameter portion 41, and the upper small-diameter portion 43 extend smoothly in the up-down direction with no step difference.

When manufacturing the stator core 23, electromagnetic steel plates are laminated one above another while positioning the steel plates on the basis of the groove portions 51. During the lamination process, the electromagnetic steel plates are laminated while bringing an axially-extending jig into contact with the groove portions 51. The electromagnetic steel plates are coaxially positioned by bringing the jig into contact with the groove portions 51.

While one illustrative preferred embodiment of the present invention has been described above, the present invention is not limited to the aforementioned preferred embodiment.

Figure 9:
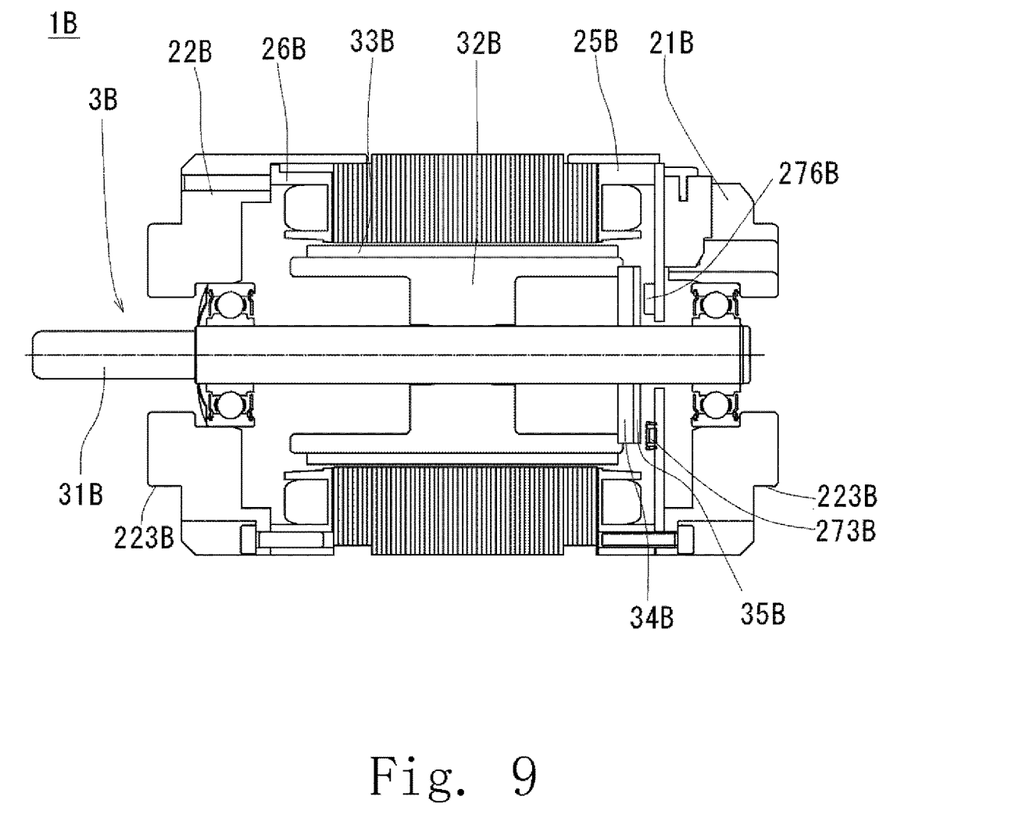
FIG. 9 is a section view showing a motor according to one modified example of a preferred embodiment of the present invention.

FIG. 9 is a partial vertical section view showing a motor 1B according to one modified example of a preferred embodiment of the present invention. In the example shown in FIG. 9, the lower bracket 22B is preferably identical in shape with the upper bracket 21B. Likewise, the lower insulator 26B is preferably identical in shape with the upper insulator 25B. A spigot joint and a screw hole are provided in each of the upper bracket 21B and the lower bracket 22B. This makes it possible to arrange the motor 1B in any direction, so as to increase the degree of freedom in designing a device body. This also makes it possible to use components in common.

Each of the upper bracket 21B and the lower bracket 22B according to the present modified example preferably includes a small-diameter cylinder portion 223B having a cylindrical or substantially cylindrical shape. When attaching the motor 1B to a drive device, the outer circumferential surface of the small-diameter cylinder portion 223B is fitted to the housing of the drive device. This makes it possible to easily position the motor 1B and the drive device.

In the present modified example, the motor 1B preferably includes a rotor 3B with a shaft 31B, a rotor holder 32B, and a rotor magnet 33B. The rotor 3B preferably further includes an encoder. In other words, the rotary unit 3B further includes a position-detecting magnet 34B and a magnetic plate 35B. In addition to the magnetic sensor 273B, a photo sensor 276B is mounted on the circuit board 27B. The position-detecting magnet 34B is magnetized with a position-detecting magnetization pattern. The magnetic plate 35B is preferably a disc-shaped magnetic body perpendicular or substantially perpendicular to the center axis J1 and is a so-called encoder disc. The magnetic plate 35B is preferably made of, e.g., stainless steel. In the magnetic plate 35B, a plurality of slits as apertures is defined along the circumferential direction. The surface of the position-detecting magnet 34B is exposed through the slits. The magnetic plate 35B is attracted onto the upper surface of the position-detecting magnet 34B. The magnetic plate 35B may be fixed to the position-detecting magnet 34B by an adhesive agent. In place of the magnetic plate 35B, a non-magnetic disc made of a resin or the like may be bonded to the position-detecting magnet 34B. The surface of the magnetic plate 35B is preferably a reflection surface having metallic luster.

The surface of the position-detecting magnet 34B is less light-reflective than the magnetic plate 35B. The photo sensor 276B is a reflection-type sensor and includes a light emitting unit and a light receiving unit. The light emitted from the light emitting unit is irradiated on the position-detecting magnet 34B and the magnetic plate 35B. Along with the rotation of the rotary unit 3B, the light reception intensity in the light receiving unit varies intermittently, thus generating a pulse signal indicative of the rotation of the rotary unit 3B. Consequently, the rotation speed of the rotary unit 3B is accurately detected. That is to say, the rotation of the rotary unit 3B is detected by the encoder.

In another modified example, the outer circumferential surface of the large-diameter portion 42 may have a region partially covered with the upper bracket 21 or the lower bracket 22. However, it is desirable that, as in the foregoing preferred embodiment, the outer circumferential surface of the large-diameter portion 42 is exposed from the upper bracket 21 or the lower bracket 22 over the entire circumference thereof. In this case, it is possible to reduce the variations of the magnetic characteristic in the vicinity of the outer circumferential surface of the large-diameter portion 42.

The border between the outer circumferential surface of the lower small-diameter portion 41 and the outer circumferential surface of the large-diameter portion 42 may be the step surface 44 as in the foregoing preferred embodiment or may be a smoothly-extending curved surface. This holds true in case of the upper small-diameter portion 43.

The lower small-diameter portion 41 may be indirectly fixed to the inner circumferential surface of the large-diameter cylinder portion 222 through another member. However, if the lower small-diameter portion 41 is directly fixed to the inner circumferential surface of the large-diameter cylinder portion 222 as in the foregoing preferred embodiment, it is possible to enhance the fixing strength and the positioning accuracy of the lower small-diameter portion 41 with respect to the large-diameter cylinder portion 222.

The lower insulator 26 may be fixed to the stator core 23 by the coil 24 or may be press-fitted to the inside of the large-diameter cylinder portion 222 of the lower bracket 22. The lower insulator 26 may be spaced apart from the bottom portion 221 of the lower bracket 22 as in the foregoing preferred embodiment or may make contact with the bottom portion 221 of the lower bracket 22.

The number of the groove portions 51 provided on the outer circumferential surface of the stator core 23 may be one, two, four, or more. For example, two or more groove portions may be arranged on the outer circumferential surface of the stator core 23. The shape of the groove portions 51 may differ from the shape used in the foregoing preferred embodiment. In place of the groove portions 51 or in addition to the groove portions 51, a plurality of axially-extending protrusion portions may be arranged on the outer circumferential surface of the stator core 23. If at least one reference surface intersecting the outer circumferential surface of the stator core 23 and extending over the small-diameter portions and the large-diameter portion is included in the groove portions or the protrusion portions, it becomes possible to position a plurality of electromagnetic steel plates using the reference surface.

While the three-phase brushless motor is preferably used in the aforementioned preferred embodiments, the present invention is not limited thereto. It may be possible to use a single-phase or two-phase brushless motor. Moreover, it may be possible to use a brush motor provided with brushes and a commutator. The preferred embodiments of the present invention may be applied to other types of motors such as, for example, a stepping motor and the like.

While the protrusion portion preferably has an annular or substantially annular shape in the aforementioned preferred embodiment, the present invention is not limited thereto. The protrusion portion may have a flat shape or any other shapes.

The respective elements included in the preferred embodiments and the modified examples described above may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
a shaft arranged along a center axis extending in an up-down direction extending from an axially upper portion of the motor to an axially lower portion of the motor;
a rotor magnet arranged in an annular shape about the center axis and configured to rotate together with the shaft;
an armature arranged to cover the rotor magnet at the radial outer side thereof;
an upper bracket fixed to an axially upper portion of the armature, the upper bracket holding an upper bearing to rotatably support the shaft at the radial center thereof; and
a lower bracket fixed to an axial lower portion of the armature, the lower bracket holding a lower bearing to rotatably support the shaft at the radial center thereof; wherein
the armature includes an annular core-back, a plurality of magnetic pole teeth protruding radially inward from the core-back, an insulator arranged to cover at least upper surfaces and lower surfaces of the magnetic pole teeth, and a coil defined by a conductive wire wound around the magnetic pole teeth through the insulator, the insulator including an annular core-back insulating portion arranged radially outward of the coil and extended axially upward, the upper bracket making direct or indirect contact with the core-back insulating portion in an axial direction and making contact with the core-back insulating portion in a radial direction, the upper bracket being fixed to the core-back insulating portion by a plurality of fixing members positioned radially inward of an outer circumferential surface of the core-back; and
the plurality of fixing members include axially lowermost surfaces which are positioned axially above an axially uppermost surface of the core-back in the up-down direction extending from the axially upper portion of the motor to the axially lower portion of the motor.

2. The motor of claim 1, wherein the upper bracket includes a cover portion and a protrusion portion protruding axially downward from the cover portion, the protrusion portion making contact with an outer circumferential surface of the core-back insulating portion.

3. The motor of claim 2, wherein the core-back includes an outer circumferential surface located near the upper end thereof, the outer circumferential surface of the core-back including a large-diameter portion and an upper small-diameter portion positioned above the large-diameter portion, the upper small-diameter portion being smaller in outer diameter than the large-diameter portion, the protrusion portion making contact with the upper small-diameter portion.

4. The motor of claim 3, further comprising:
a circuit board interposed between the upper bracket and the core-back insulating portion; wherein
the circuit board has a disc shape or a substantial disc shape when seen in a plan view, the outer diameter of the circuit board being equal to the outer diameter of the upper small-diameter portion.

5. The motor of claim 4, wherein the circuit board includes positioning portions defined by through-holes or cutouts, the core-back insulating portion including positioning protrusion portions accommodated within the positioning portions.

6. The motor of claim 2, wherein the core-back insulating portion includes raised portions protruding radially outward beyond the coil, the raised portions including fixed portions to which the fixing members are fixed.

7. The motor of claim 6, wherein the protrusion portion includes depressed portions which are depressed axially upward from the lower end thereof, the raised portions positioned within the depressed portions.

8. The motor of claim 6, wherein the protrusion portion includes a portion arranged below lower ends of the raised portions and extending in a circumferential direction.

9. The motor of claim 1, further comprising:
a circuit board interposed between the upper bracket and the core-back insulating portion.

10. The motor of claim 9, further comprising:
at least one of a position-detecting magnet and a magnetic plate configured to rotate together with the shaft; and
at least one of a magnetic sensor and a photo sensor mounted on the circuit board.

11. The motor of claim 1, wherein the upper bearing is positioned axially above the axially lower ends of the fixing members.

12. The motor of claim 1, wherein the insulator includes an upper insulator covering the upper surfaces of the magnetic pole teeth and a lower insulator covering the lower surfaces of the magnetic pole teeth, the upper insulator including the core-back insulating portion.

13. The motor of claim 1, wherein the upper bearing is a ball bearing, the upper bracket including a holding portion axially making contact with an upper end surface of an outer race of the ball bearing.

14. The motor of claim 1, wherein the fixing members are screws.

15. The motor of claim 1, wherein the upper bracket and the lower bracket are identical or substantially identical in shape with each other.

16. The motor of claim 1, wherein at least one of the upper bracket and the lower bracket includes a cylindrical or substantially cylindrical small-diameter cylinder portion.

* * * * *